(12) United States Patent
Fukumori et al.

(10) Patent No.: US 8,342,117 B2
(45) Date of Patent: Jan. 1, 2013

(54) COATING APPARATUS

(75) Inventors: Takeshi Fukumori, Chiyoda-ku (JP);
Shigeharu Kanemoto, Chiyoda-ku (JP);
Hidenori Mizuno, Chiyoda-ku (JP);
Syuji Morito, Chiyoda-ku (JP);
Hiroyuki Maehara, Chiyoda-ku (JP);
Keishi Wakabayashi, Chiyoda-ku (JP)

(73) Assignee: Satake Corporation, Tokyo (JP)

( * ) Notice: Subject to any disclaimer, the term of this patent is extended or adjusted under 35 U.S.C. 154(b) by 497 days.

(21) Appl. No.: 12/734,264

(22) PCT Filed: Oct. 31, 2008

(86) PCT No.: PCT/JP2008/069929
§ 371 (c)(1),
(2), (4) Date: Apr. 21, 2010

(87) PCT Pub. No.: WO2009/057770
PCT Pub. Date: May 7, 2009

(65) Prior Publication Data
US 2010/0242838 A1 Sep. 30, 2010

(30) Foreign Application Priority Data

Nov. 1, 2007 (JP) .................................. 2007-285203

(51) Int. Cl.
*B05C 5/02* (2006.01)
*B05C 19/04* (2006.01)

(52) U.S. Cl. ................ 118/16; 118/19; 118/20; 118/22; 118/23; 118/24; 118/26; 99/516; 99/494

(58) Field of Classification Search ...... 118/16, 118/19, 20, 22, 23, 24, 26, 303, 308, 66, 118/314, 320, 418; 426/289, 293; 99/516, 99/494; 366/234, 235, 238

See application file for complete search history.

(56) References Cited

U.S. PATENT DOCUMENTS

| 3,615,676 A | 10/1971 | McKown et al. |
| 4,755,390 A | 7/1988 | Calandro et al. |
| 5,531,826 A * | 7/1996 | Fusejima et al. ................ 118/19 |
| 5,964,146 A * | 10/1999 | Kelly et al. ..................... 99/467 |
| 7,810,446 B2 * | 10/2010 | Degady et al. .................. 118/13 |

FOREIGN PATENT DOCUMENTS

| JP | 8-322486 A | 12/1996 |
| JP | 2003-169611 A | 6/2003 |
| JP | 2005-095070 A | 4/2005 |
| JP | 2006-000034 A | 1/2006 |
| JP | 2006-223117 A | 8/2006 |
| JP | 2006-304690 A | 11/2006 |
| JP | 2007-110971 A | 5/2007 |

* cited by examiner

*Primary Examiner* — Laura Edwards
(74) *Attorney, Agent, or Firm* — Chapman and Cutler LLP

(57) ABSTRACT

There is provided a coating apparatus capable of continuously producing coated rice having powdered coating material adhered to the grains and including a drying process to prevent the grains from being bonded to one another and make the grain surfaces smoother upon drying of the grains. The coating apparatus comprising a binder coating unit for applying liquid binder to the grains being conveyed through a coating and stirring chamber to coat the grain surfaces with the binder; a adhering unit for adding powder material to the grains conveyed through a adhering and stirring chamber to adhere the powdered material to the grain surface by the binder; and a drying unit including a drying and stirring chamber through which the grains are conveyed while being stirred, a blow passage for blowing hot air into the drying chamber to dry the grains, and an exhaust passage for exhausting the hot air from the drying chamber.

6 Claims, 11 Drawing Sheets

DETAIL D

COATING APPARATUS

FIELD OF THE INVENTION

The present invention relates to a coating apparatus for continuously applying powdered material to grains.

BACKGROUND OF ART

For the purpose of richening nutrient, it is conventionally known to apply liquid coating material containing effective component to the surfaces of grains. In the case of coating the grain surfaces with slightly soluble or insoluble vegetable fiber such as rice bran or wheat bran which has been known as effective component, binder is used to apply powder of the vegetable fiber to the grain surfaces. For example, reference 1 discloses that water containing binder, rice bran, and grains are stirred within a drum to apply the rice bran to the grain surfaces.

Reference 2 discloses a method for manufacturing coated rice wherein powdered material is continuously applied to the grains. Although the continuous application of the powdered to the grains is possible, the grains are coated with release agent in a process subsequent to the application of powdered material to the grains, in order to prevent the grains from being adhered to one another. However, reference 2 does not disclose any step for drying the grains after coating, and therefore, any possibility of continuously producing coated rice is uncertain.

Reference 3 discloses the use of a vibration-type drying apparatus to continuously carry out the drying. Reference 4 discloses disk conveyor-type drying apparatus. In the vibration-type drying apparatus, the vibration can facilitate adhering grains to one another and in the disk conveyor-type drying apparatus, it is difficult to make the grain surfaces smoother. In addition, since the disk conveyor has to ensure a space required to place the grains thereon, any compactness of the apparatus can not be expected.

For this reason, the foregoing, it is desired to provide a compact coating apparatus capable of applying uniformly powdered material consisting of slightly soluble or insoluble effective component, such as rice bran, wheat bran or the like, to grains, continuously carrying out drying of the grains after the application of the powdered material to prevent the grains from being adhering to one another, and making the grain surfaces smoother after application of the powdered material to the grains.

Reference 1: Japanese Patent Publication 2005-95070
Reference 2: Japanese Patent Publication 2006-304690
Reference 3: Japanese Patent Publication Heisei 8-322486
Reference 4: Japanese Patent Publication 2007-110971

SUMMARY

An object of the present invention is to provide a coating apparatus capable of continuously manufacturing coated rice by depositing a layer of binder onto the surfaces of grains, applying powdered material to the deposited layer of binder on the grain surfaces, drying the grains to prevent the grains from being adhered to one another, and making the grains having the powdered material applied thereto, smoother upon drying the grains.

This object of the present invention can be achieved by providing a coating apparatus comprising a binder coating unit including a coating chamber defined by a cylindrical shell, stirring and conveying means mounted in coating chamber along its longitudinal direction for rotation and adapted to be rotationally driven for conveyance of grains in the coating chamber in its longitudinal direction while stirring the grains, and a nozzle for spraying liquid binder onto the grains supplied into the coating chamber to coat the grain surfaces with binder;

a powdered material adhering unit including an adhering chamber defined by a cylindrical shell, stirring and conveying means mounted in adhering chamber along its longitudinal direction for rotation and adapted to be rotationally driven for conveyance of grains having the binder thereon through the adhering chamber in its longitudinal direction while stirring the grains having the binder thereon, and a metering feeder for adding powdered material to the grains; and a drying unit including a drying chamber comprised of permeable cylindrical screen, stirring means mounted in the drying chamber along its longitudinal direction for rotation and adapted to be rotationally driven to convey grains through the drying chamber in its longitudinal direction while stirring the grains through the drying chamber in its longitudinal direction while stirring the grains after the grains has been transferred from said adhering unit to the drying chamber, a blow passage for blowing hot air into the drying chamber to dry the grains, and an exhaust passage for exhausting the hot air from the drying chamber.

In a preferred embodiment of the invention, said stirring means includes a shaft mounted in the drying chamber along its longitudinal direction for rotation, and comprises a plurality of stirring means mounted on the shaft along its longitudinal axis and arranged to convey the grains at stepwise decreased speeds of conveyance in the downstream direction of conveyance.

In a further embodiment of the invention, said stirring means comprises stirring plates mounted on said shaft along its longitudinal axis and parallel to the longitudinal axis, and each having a plurality of paddles, the tips of said paddles having an angle relative to the direction of conveyance.

In a further embodiment of the invention, in said adhering unit, the powdered material is added to the grains while applying vibration to the cylindrical shell defining the adhering chamber.

The coating apparatus according to the invention comprises a coating process for coating grain surfaces with binder, and an adhering process for adhering powdered material to the grain surfaces, wherein there is provided a drying process for drying the grains from the adhering process, with hot air while conveying and stirring the grains, thereby continuously producing coated rice.

Located at a plurality of sections are stirring means arranged to have different speeds of conveyance of the grains. Due to this arrangement of the stirring means, higher speed of conveyance of the grains can be provided on the upstream side during drying of the grains. This results in smooth conveyance of the grains toward the downstream side, which have not been dried yet at the initial stage of drying after the application process, to prevent any clogging due to adhesion of the grains to one another and their deposition.

When the grains are conveyed toward the downstream side of the drying unit, the binder on the grain surfaces is nearly dried so that any clogging due to the adhesion or deposition of the grains is unlikely to occur. From this reason, the stirring means located on the downstream side has a lower speed of conveyance of the grains so that longer drying time can be obtained. Therefore, the distance of conveyance in the drying unit is reduced to makes compactness of the coating apparatus possible.

Since the grains are fully stirred in the drying chamber upon-drying of the grains, the grain surfaces are smoothly formed by rubbing the grains against one another and by contacting the perforated screen of the drying chamber.

Furthermore, since the powdered material is applied to the grains, the invention enables slightly soluble of insoluble effective component to be adhered to the grains.

Since the powdered material is applied to the grains while applying vibration to the grains, the action of vibration facilitates application of the powdered material onto the grain surfaces.

BRIEF DESCRIPTION OF THE DRAWINGS

FIG. 5 b is a section view of the nozzle taken along line A-A of FIG. 5 a;

BEST MODE FOR CARRYING OUT THE INVENTION

Figure 1:
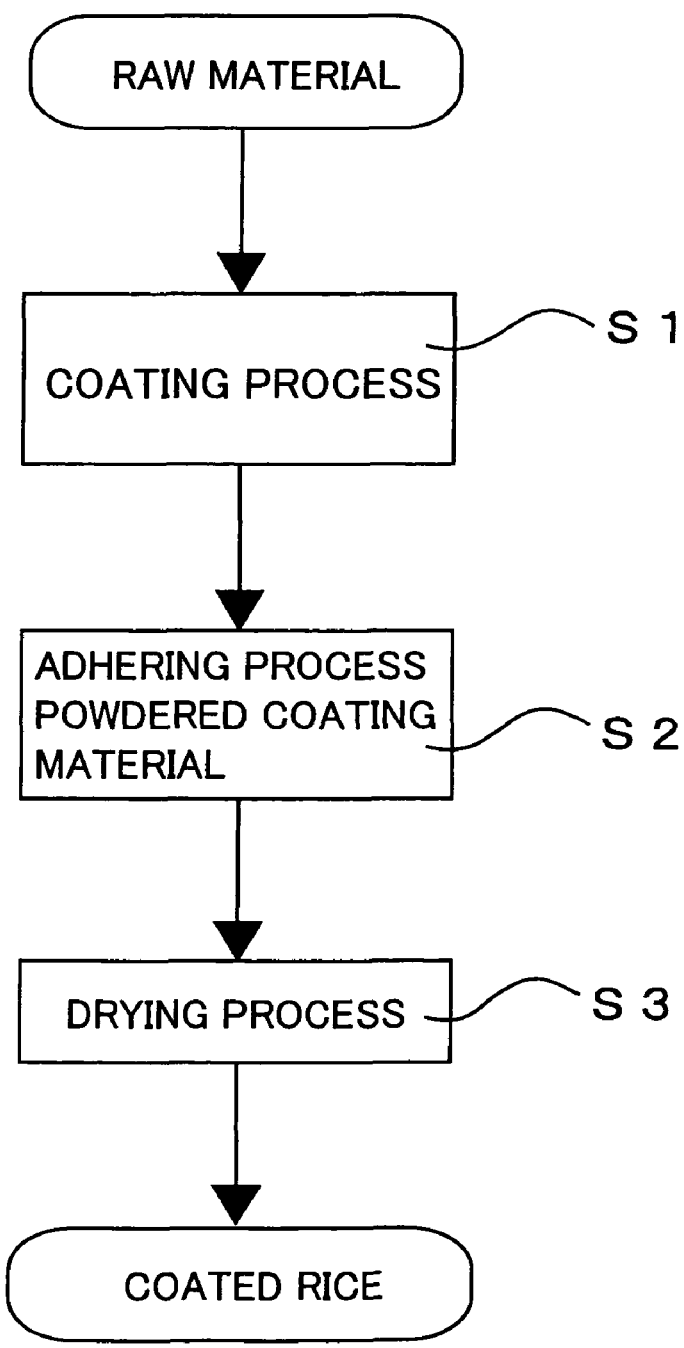
FIG. 1 is a flow chart showing steps of producing coated rice in the coating apparatus according to the invention.

A preferred embodiment of the present invention will be described hereafter with reference to the accompanying drawings. FIG. 1 shows a flowchart 100 for sequence of a process for producing coated rice, employing a coating apparatus 1 according to the invention. The method comprises a binder coating step, a powdered material adhering step, and a drying step in the sequence. Although in this embodiment, milled rice which has been prewashed, is used as grains, unwashed rice, grains other than the rice and even seeds may be used as grains. The invention is applicable to parboiled rice, brown rice, half-milled rice, or milled rice with embryos. Unwashed grains can be used as feed for domestic animals. The coating apparatus according to the invention could be utilized to apply powdered material onto the surfaces of the granulated rice and resin pellets.

Figure 2:
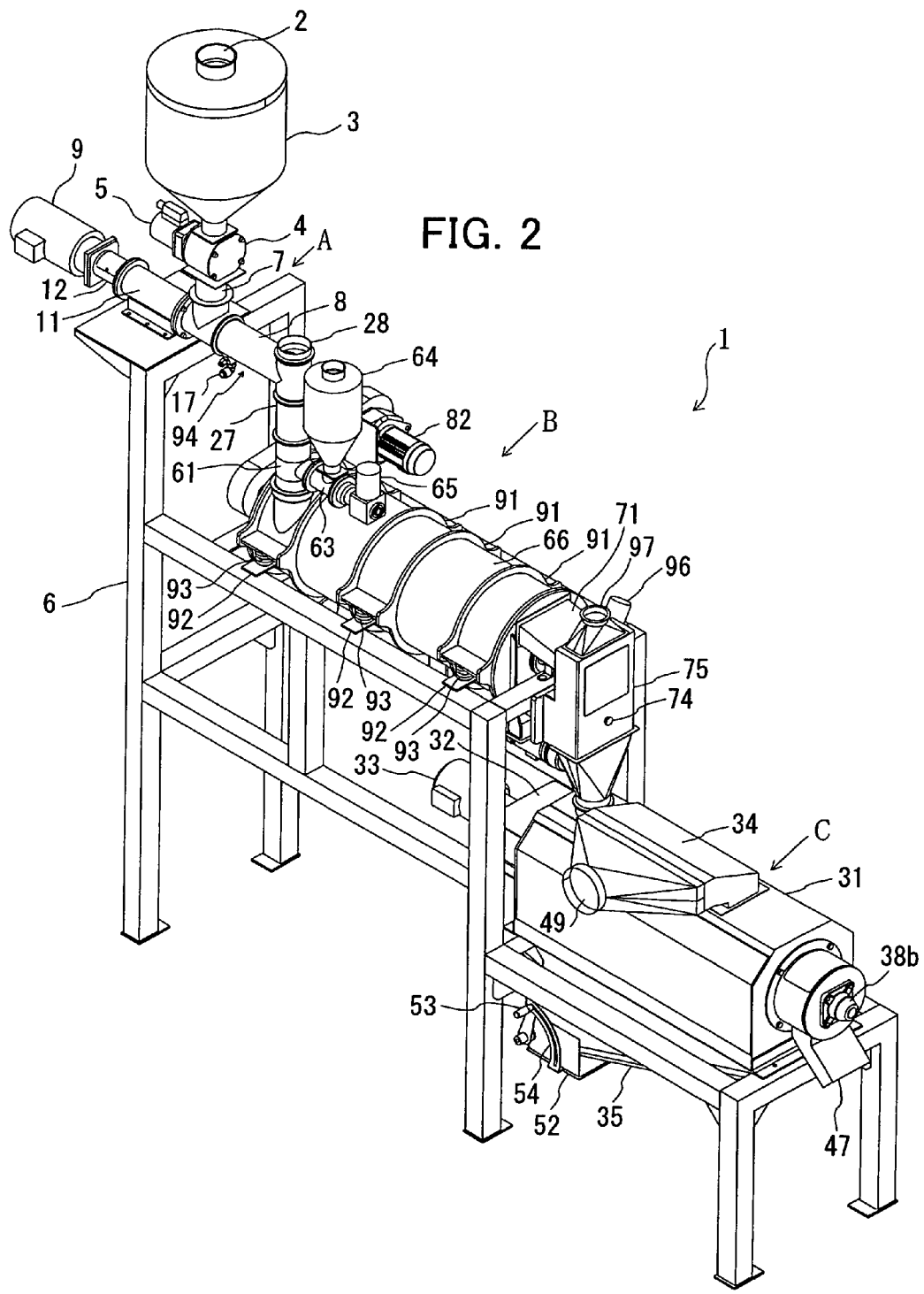
FIG. 2 is a perspective view of the coating apparatus according to the invention.

FIG. 2 is a perspective view of the entire coating apparatus according to the invention. The coating apparatus comprises a binder coating unit A for implementing the coating of the grain surfaces with binder, a powdered material adhering unit B for implementing the adhesion of powdered material to the layer of binder on the grain surfaces, and a drying unit C for implementing the dying of the grains from the adhering unit, these units being mounted on a body frame 6.

Figure 3:
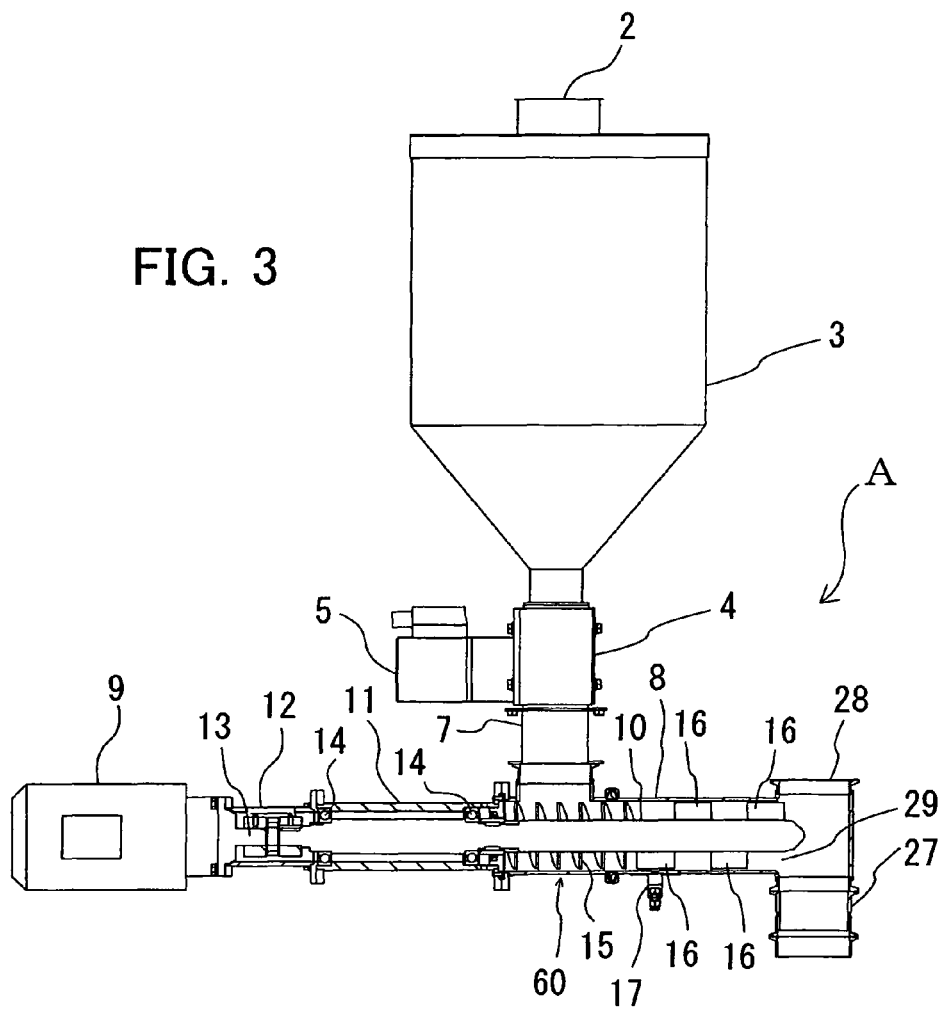
FIG. 3 is a schematic section view of binder coating unit A in the coating apparatus according to the invention.

The details of the binder coating unit A will first be described hereafter. Referring to FIG. 3 which shows a schematic view, in cross-section, of the binder coating unit A, the later includes a hopper 3 having an opening 2 formed at the top thereof to supply grains into the hopper 3, a rotary valve 4 defining a metering feeder driven by means a motor 5 to feed the grains from the hopper 3 through a feed pipe 7 into the interior of the coating unit A.

Binder coating unit A also includes a horizontal barrel-type shell 8 defining a coating chamber therein, a bearing section 11, a coupling 12 and a motor 9. An output shaft 13 of the motor 9 is connected through the coupling 12 to a shaft 10 which extends horizontally within the shell 8 and is rotationally supported by means of bearings 14 mounted in the bearing section 11.

Figure 4:
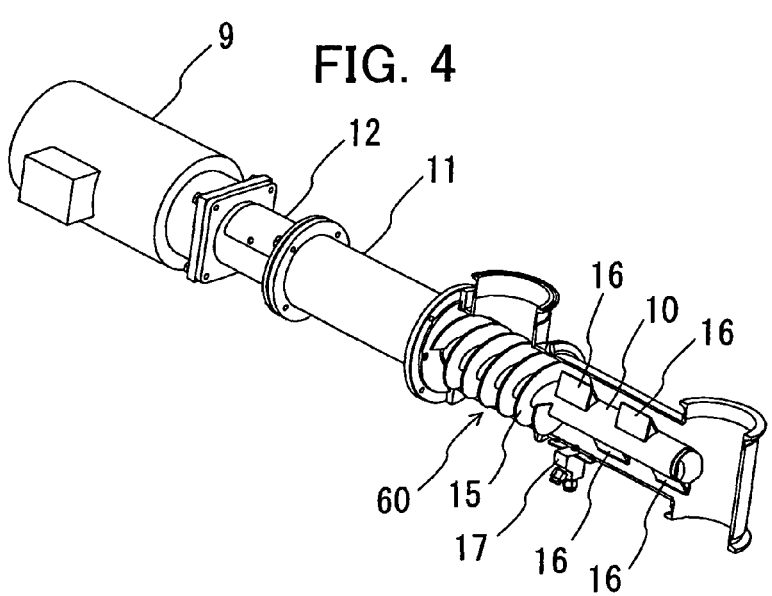
FIG. 4 is a perspective view of the binder coating unit A partly cut away to show its interior.

FIG. 4 is a partly cut-way view of the shell 8 of the coating unit A. As shown in FIG. 4, a helical screw blade 15 is mounted on a portion of the shaft below the feed pipe 7 to provide a single thread screw conveyor 60 for conveying the grains from the feed pipe 7 through the shell. The forward portion of the shaft 10 has a plurality of stirring vanes 16 mounted thereon to stir the grains within the interior of the shell 8. Thus, the single thread screw conveyor 60 and the stirring vanes 16 define conveying and stirring means in the binder coating unit A.

The stirring vanes 16 serve to stir the grains being conveyed through the shell 8 to uniformly coat the surfaces of the grains with binder by injecting the binder into the chamber of the shell. As shown in FIG. 4, the stirring vanes 16 are vertically positioned parallel to the longitudinal axis of the shaft 10 and each has in section a wedge-like shape (a triangle shape) converging toward a tip thereof from a face jointed to the shaft 10. Due to their wedge-like shape, the stirring vanes are not subjected to any damage which when they stir the grains which has coated with high viscous binder, and the wedge-like shape of the stirring vanes make it easier to clean the stirring vanes.

Figure 5:
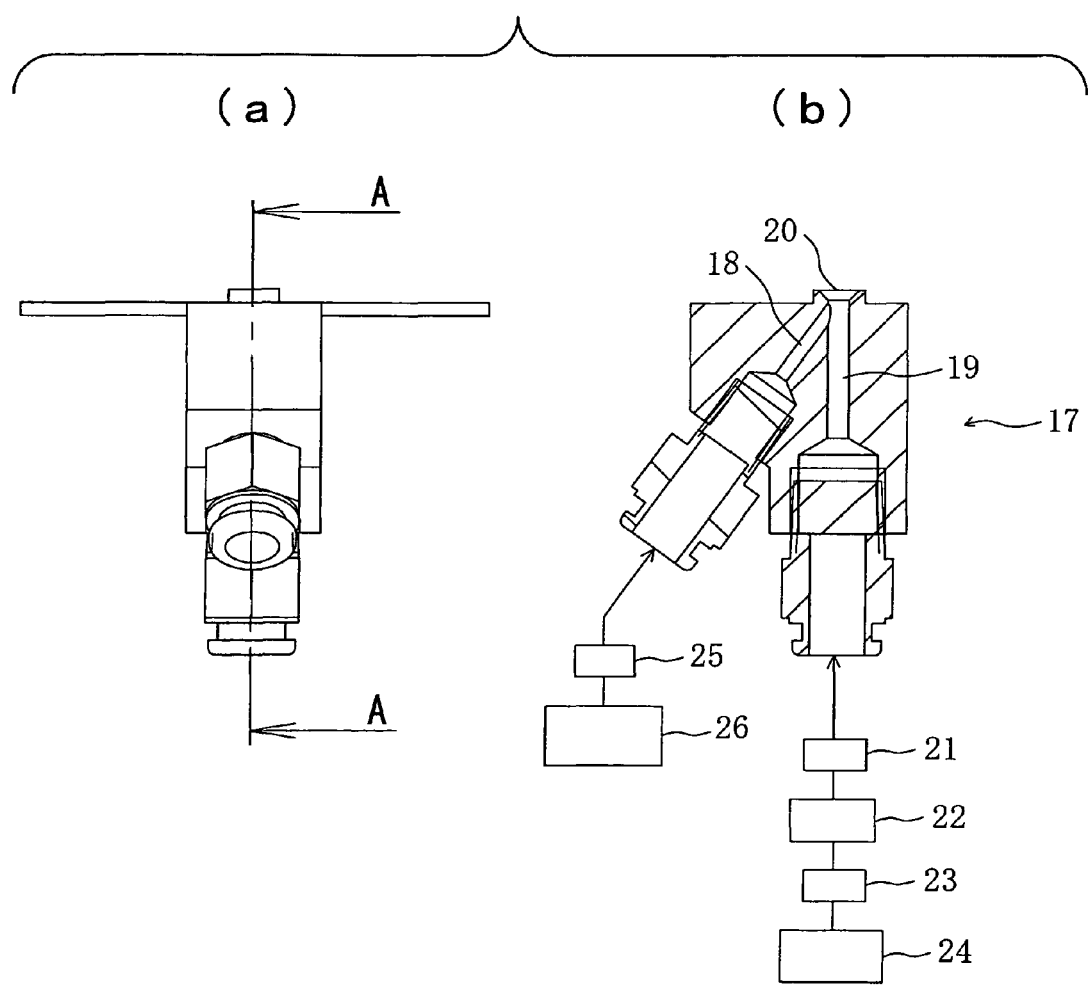
FIG. 5 a is a schematic view of a nozzle 17.

There is provided a nozzle assembly 17 for injecting or spraying the liquid binder onto the grains which are conveyed through the coating chamber of the shell toward its discharge portion 29 under the action of the helical blade 15. FIG. 5(a) is an enlarged view of the nozzle assembly 17 while FIG. 5(b) is a cross-sectional view of the nozzle assembly 17. The nozzle assembly 17 includes an air nozzle 18 for jetting air, a liquid nozzle 19 for liquid binder, and a nozzle opening 20 for injecting the binder in an atomized form into the coating chamber of the shell 8.

The liquid binder is delivered from a reservoir 24 to the nozzle 19 by means of a pump 22. A valve 23 is provided between the reservoir 24 and the pump 22 while a flow regulating valve 21 is provided between the pump 22 and liquid nozzle 19.

An air compressor 26 is provided for pumping air to the air nozzle 18 under pressure. A pressure adjusting valve 25 is provided between the air nozzle 18 and the compressor 26 for adjusting the pressure of the air to be pumped to the air nozzle 18. The pressure of air may be adjusted at an appropriate value which is determined through a test or the like.

The liquid nozzle 19 and air nozzle 18 are positioned with their axes intersecting at the nozzle opening 20 such that the liquid binder jetted through the liquid nozzle 19 is atomized by jetting compressed air from air nozzle 18. More particularly, the compressed air is mixed with the jet of the liquid binder from the liquid nozzle 19 to atomize the liquid binder so that the atomized binder is injected to the grains conveyed through the shell 8 to coat the grain surface with the binder.

The grains are discharged from an outlet opening 29 of the shell 8 through a transferring passage 27 into the adhering unit B. The passage 27 has at its top end a opening 28 through which hot air flows from a source of hot air generation such as a heat exchanger (not shown) into the passage 27 so that it can be subsequently introduced through an opening 68 into the adhering unit B. The grains which are discharged through the outlet opening 29, have their surfaces dried to a certain extent by the hot air flowing within the passage 27. The flow of hot air results in dispersion of the grains, thereby preventing them from being adhered to one another.

Figure 6:
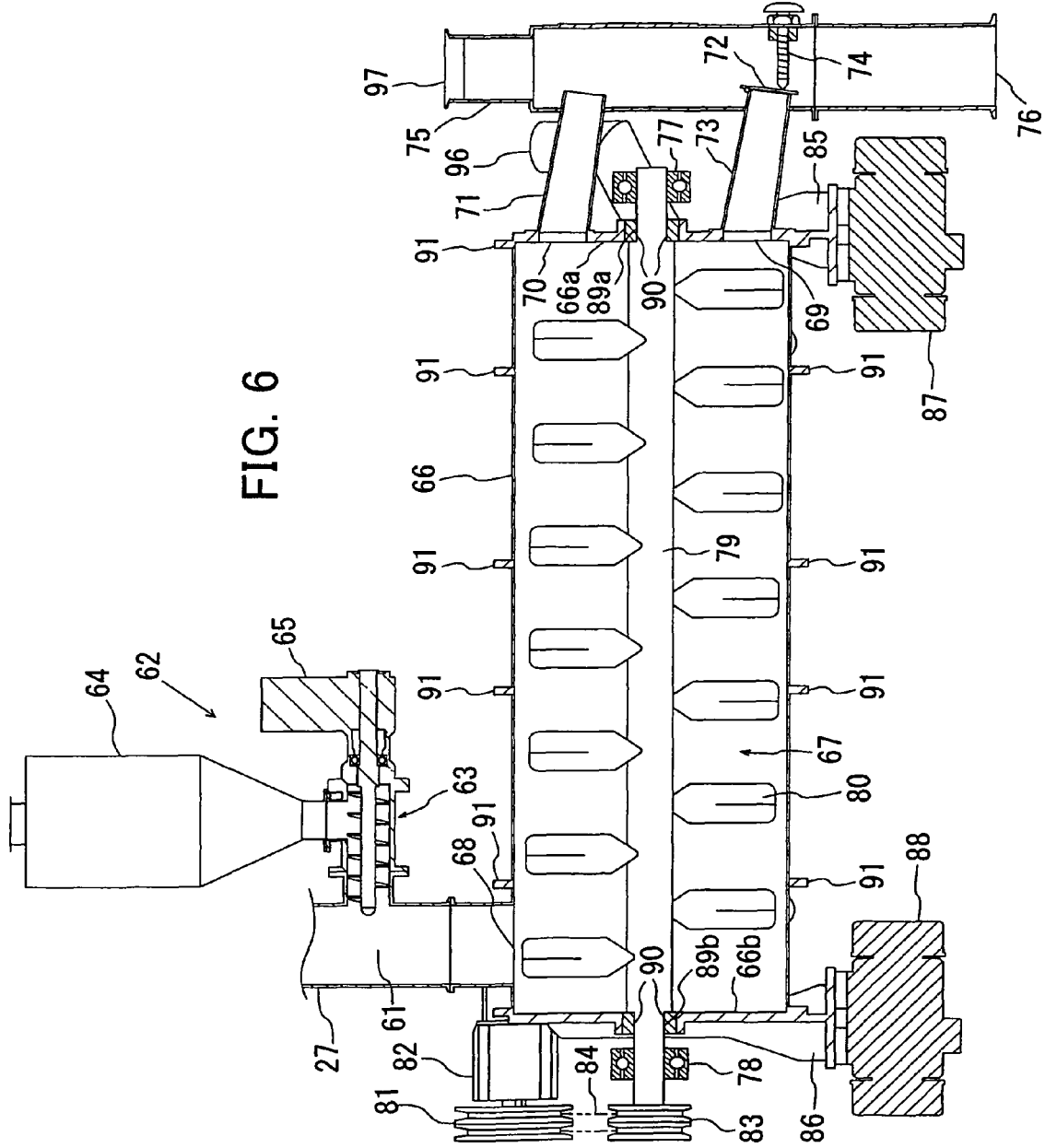
FIG. 6 is a section view of powdered material adhering unit B in the coating apparatus cut away to show stirring chamber 94 thereof.

FIG. 6 show a schematic cross-sectional view of the powdered material adhering unit B in the coating apparatus. The adhering unit B includes a metering feeder 62 for adding powdered material to the grains within the passage 27 and an adhering chamber 67 defined by a stationary cylindrical shell 66. The metering feeder 62 includes a conveying section 63, a motor 65 and a hopper 64. The conveying section 63 comprises a screw conveyor rotationally driven by the motor 65 to feed the powdered material from the hopper 64 toward a region 61 within the passage 27. The metering feeder 62 thus functions to add at the region 61, the metered powdered material to the grains moving downwardly from the coating unit A through the passage 27, together with the entrained hot air. Although in this embodiment, the screw conveyor has been utilized, it will be appreciated that the invention is not limited to it.

The shell 66 has a plurality of reinforcing ribs 91 secured round the shell. The shell may be installed on the frame 6 horizontally or somewhat obliquely relative to the horizon. In order to make vibration of the shell 66 possible with a generator of vibration, as described hereafter, the shell 66 is installed on the frame 6 with rubber vibration insulators 93 interposed between the shell and support members 92 secured to the frame 6.

An inlet opening 68 is formed in the shell 66 adjacent an end plate 66b for introducing from the region 61 into the shell the grains having the powdered material deposited on their surfaces. A pair of vertically spaced-apart outlet openings 69 and 70 is formed in an end plate 66a of the shell 66, the grains being discharged through those outlet openings. A discharge pipe 71 is connected to the upper outlet opening 70 while a discharge pipe 73 is connected to the lower outlet opening 69 and provided with a pivoted closure plate 72 capable of partially closing an open end thereof. Reference numeral 74 indicates a bolt with a knob, the bolt 74 being mounted in a discharge duct 75 for adjusting a degree of open of the closure plate 72 relative to the open end of the discharge pipe 73. By partly closing the open end of the discharge pipe 73 for limitation of the amount of discharge of grains, the interior of the shell 66 is filled with the grains having the powdered material deposited thereon. As the grains overflow the upper outlet opening 70, they are delivered through the discharge pipe 71 into the discharge duct 75.

Disposed within the deposition chamber 67 is a main shaft 79 which extends through opening 89a and 89b in the end plates 66a and 66b and are supported at ends in bearings 77, 78 secured to the frame 6. A plurality of stirring vanes 80 is secured to the shaft 79 to define conveying and stirring means. A pulley 83 is secured to the shaft 79 at its one end. A V-belt 84 is connected between the pulley 83 and a pulley 81 of a motor 82 installed on the frame 6 to rotate the shaft 79 at appropriate speed of rotation. Preferably, the speed of rotation is 30-100 rpm.

Below the shell 66, vibrating motors 87, 88 are provided as means for transmitting vibration through connecting members 85 and 86 to the entire shell 66. The vibration is thus transmitted through the shell to the grains to facilitate adhesion of the powdered material to the layer of binder on the grain surfaces while they are conveyed and stirred through the interior of the shell toward the discharging opening 70 by stirring vanes 80.

The openings 89a, 89b in the end plates 66a, 66b are sized to define annular gaps around the shaft 79. Elastic materials 90 are fitted in the annular gaps to absorb the vibration from the vibrating motors 87, 88 such that it is not transmitted to the shaft 79.

A duct 96 is provided for exhausting from the side of the end plate 66a hot air which passes through the interior of the shell 66, and connected to a suction fan (not shown) for exhaust of the hot air.

The discharge duct 75 has at its top end an inlet opening 97 through which hot air is blown from a source of hot air generation such as a heat exchanger (not shown) into the duct 75 and subsequently introduced into the drying unit C. The grains which are discharged through the discharge pipes 71 and 73 have been dried to a certain extent by the hot air flowing downwardly through the duct 75. The hot air also results in dispersion of the grains, thereby preventing them from being bonded to one another prior to reaching at an opening 98 of the drying unit C.

Figure 7:
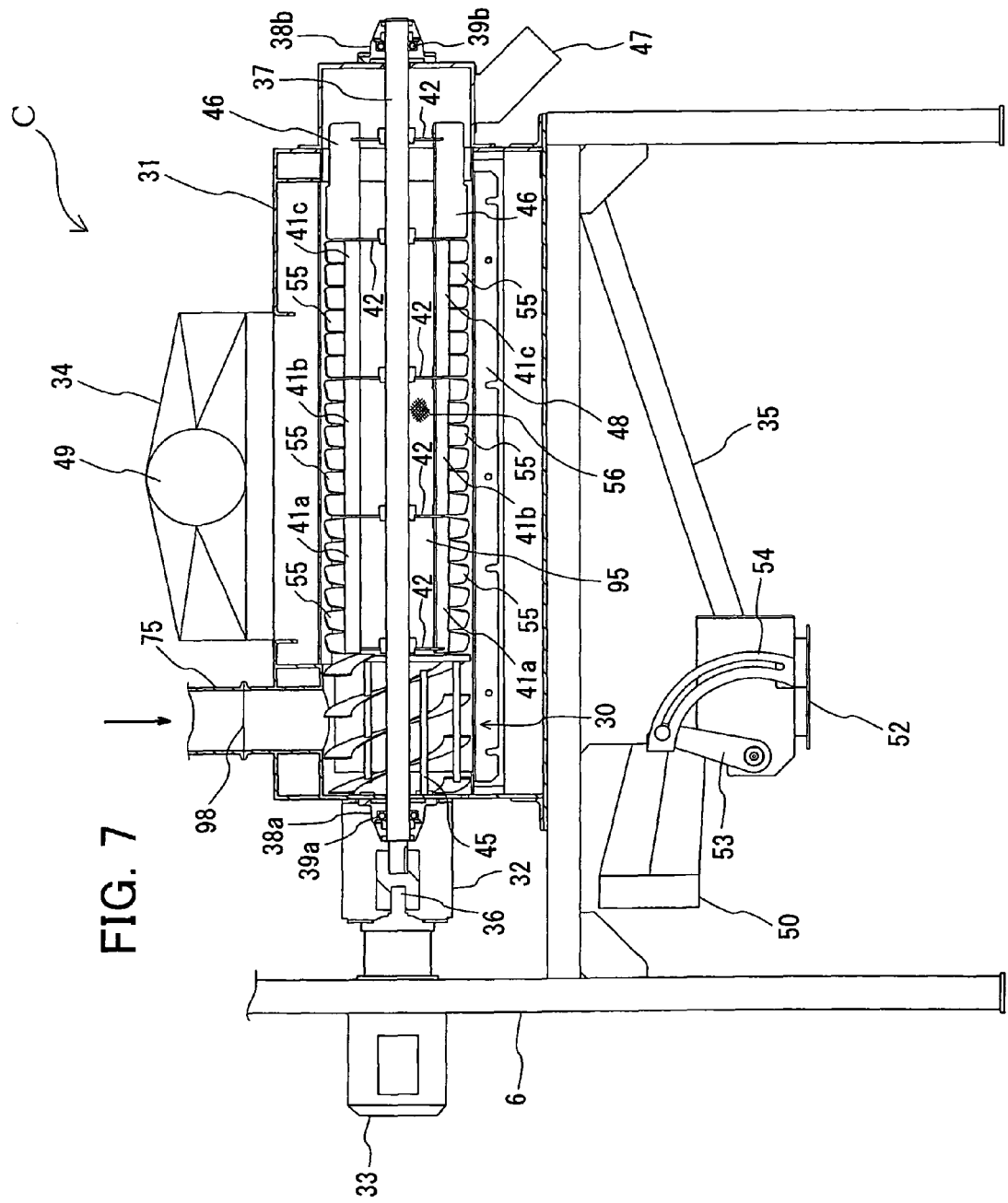
FIG. 7 is a section view of drying unit C in the coating apparatus cut away to show drying chamber 40 thereof.

FIG. 7 shows a schematic cross-sectional view of the drying unit C in the coating apparatus 1. The drying unit C includes a shell 31 within which a drying chamber 40 is provided, a coupling 32, a motor 33, a blow duct 34 and an exhaust pipe 35. A shaft 36 of the motor 33 is connected to a shaft 37 by the coupling 32, the shaft 37 extends horizontally through the drying chamber 40 of the shell 31 and is rotationally supported in bearings 39a, 39b in bearing assemblies 38a, 38b. The shaft 37 has a triple thread conveyor 30 and a plurality of stirring plates 41 mounted thereon to convey and stir the grains along and within the drying chamber.

Figure 8:
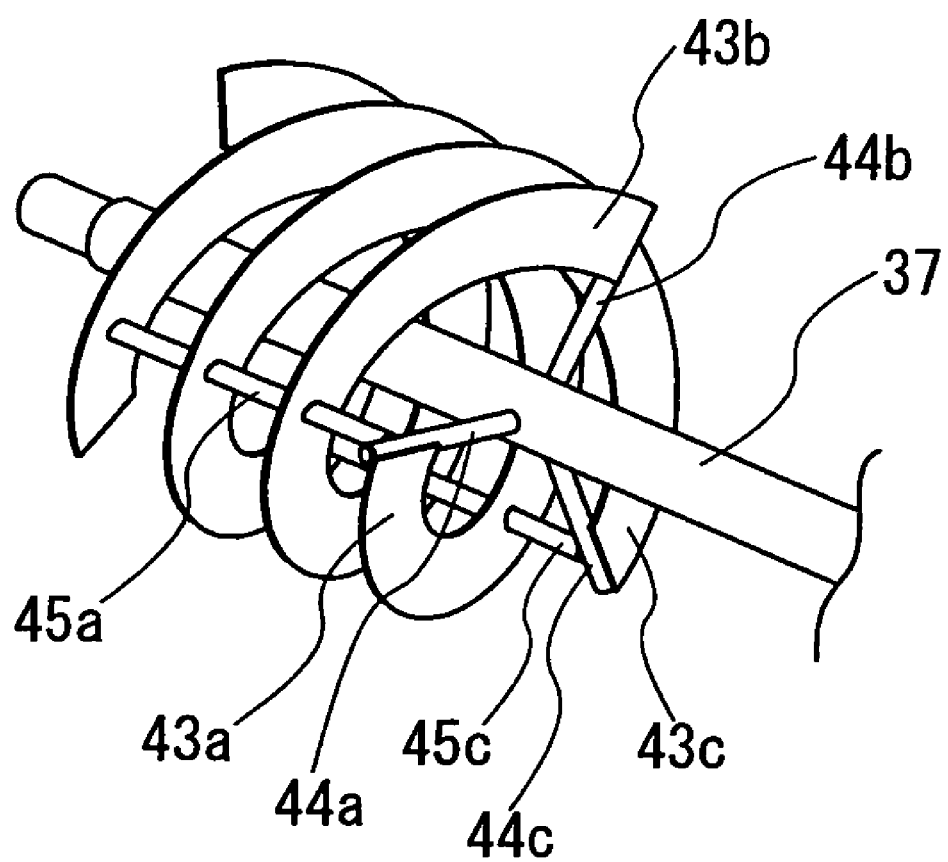
FIG. 8 is a schematic perspective view of a triple tread conveyor 30.

The triple thread conveyor 30 is disposed below the discharge duct 75 in the drying chamber 40 and functions to intensively stir the grains together with the hot air introduced through the discharge duct 75 into the drying chamber 40. FIG. 8 shows details of the triple thread conveyor 30 which is comprised of three elongate plates 43a, 43b and 43c wound around the shaft 37. The plates 43a, 43b, 43c are supported from the shaft 37 by support rods 44a, 44b, 44c secured to the shaft perpendicularly to the axis thereof so that spaces are defined between the shaft 37 and the plates 43a, 43b, 43c.

The plates 43a, 43b, 43c are connected to one another by connecting rods 45a, 45b, and 45c to reinforce and prevent them from deforming during rotation of the shaft 37. Connecting rod 45b is not shown in FIG. 8.

Figure 9:
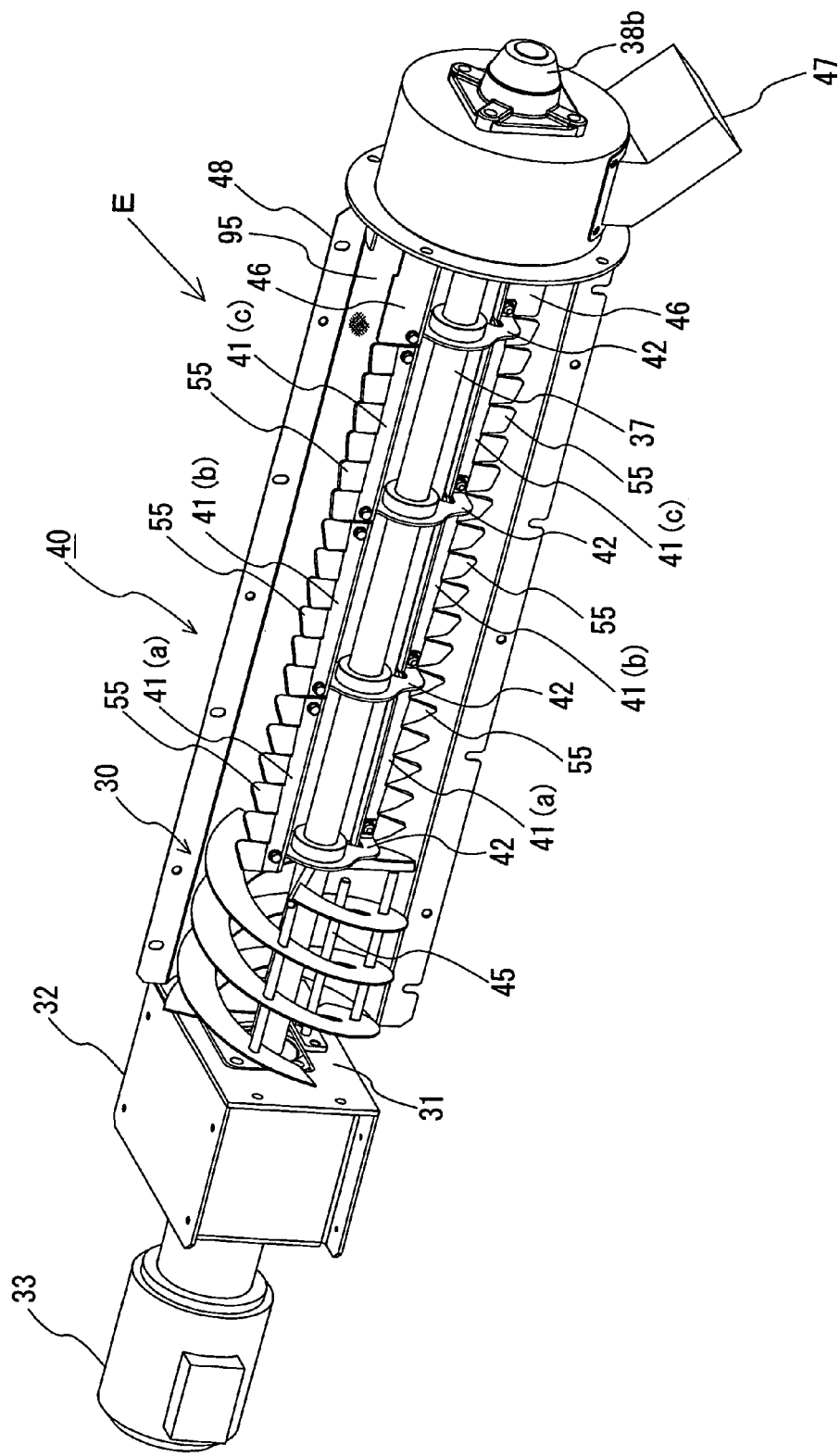
FIG. 9 is a schematic perspective view of the drying chamber 40 cut away to show its interior.

FIG. 9 shows details of the drying chamber 40. A stirring rod 45 is provided for preventing the grains from being deposited on the triple thread conveyor 30 and fixedly secured to an end face of the shell 31 parallel to the axis of the shaft 37 and between the shaft 37 and the plates 43a, 43b, 43c. This position of the stirring rod 45 is effective in preventing the grains from being bonded to one another and from being deposited onto the triple thread conveyors.

Figure 10:
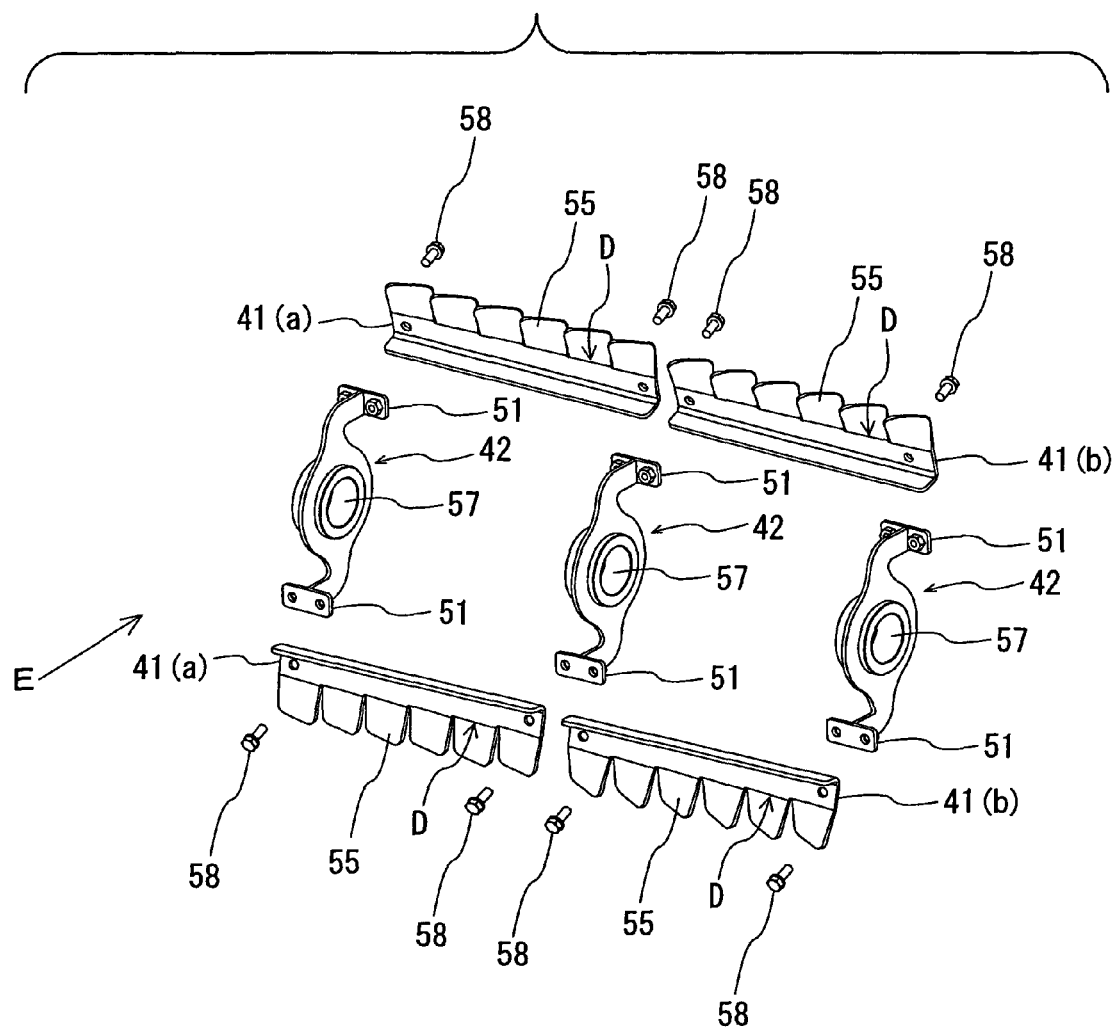
FIG. 10 is a perspective view of stirring plates disassembled from holders.

Spaced apart holders 42 are mounted on the shaft 37. Stirring plates 41 each is secured to the adjacent holders 42, 42. FIG. 10 is a perspective view of the holders and stirring plates showing how to assemble them and viewed from the direction of arrow indicated by E in FIG. 9.

Each of holders 42 is of a S-shape and is formed at its center with a hole 57 into which the shaft 37 is inserted, and at its ends with flanges 51 to which the stirring plates 41 are secured by means of screws 58. The holders 42 are preferably soldered to the shaft 37.

Each of stirring plates 41 is of a L-shape in section and has a plurality of paddles 55, the number of which is six in the preferred embodiment of the invention, but the latter is not limited to the six paddles. Each stirring plate 41 is screwed to the flanges 51 of the adjacent holders 42 to extend parallel to the axis of the shaft 37. Each of the paddles 55 of the stirring plates 41(a) is set at an angle of 45 degrees relative to the axis of the shaft 37, each of the paddles 55 of the stirring plates 41(b) is set at an angle of 30 degrees relative to the axis of the shaft 37, and each of the paddles 55 of the stirring plates 41(c) is set at an angle of 15 degrees relative to the axis of the shaft 37.

Figure 11:
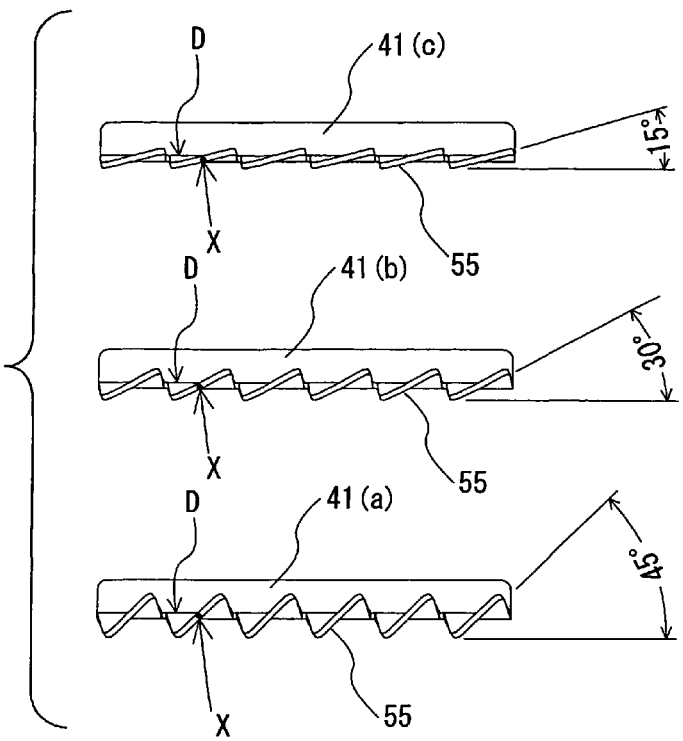
FIG. 11 is a top plan view of the stirring plates.

FIG. 11 shows a top plan view of stirring plates 41(a), 41(b), 41(c). The paddles 55 are formed integrally with the stirring plates 41 on lines as indicated by D in FIG. 10. In order to obtain the above-mentioned angles, each of the paddles is twisted around its center as indicated by X in FIG. 11. Therefore, the portion of each paddle 55 on line D is parallel to the axis of the shaft 37 as in the stirring plate 41, but the angle of the paddle gradually increases toward the tip portion thereof until approaching the set angle.

It will be appreciated that the angles of the paddles are not limited to 15°, 30°, 45° and it is possible to employ stirring plates with paddles set at any suitable angles.

Stirring plates 46 are disposed adjacent to an outlet opening 47 of the drying unit C and mounted on the shaft 37 through the holders 42 parallel to the axis of the shaft. As can be seen, the stirring plates 46 have no paddles as in the stirring plates 41.

Figure 12:
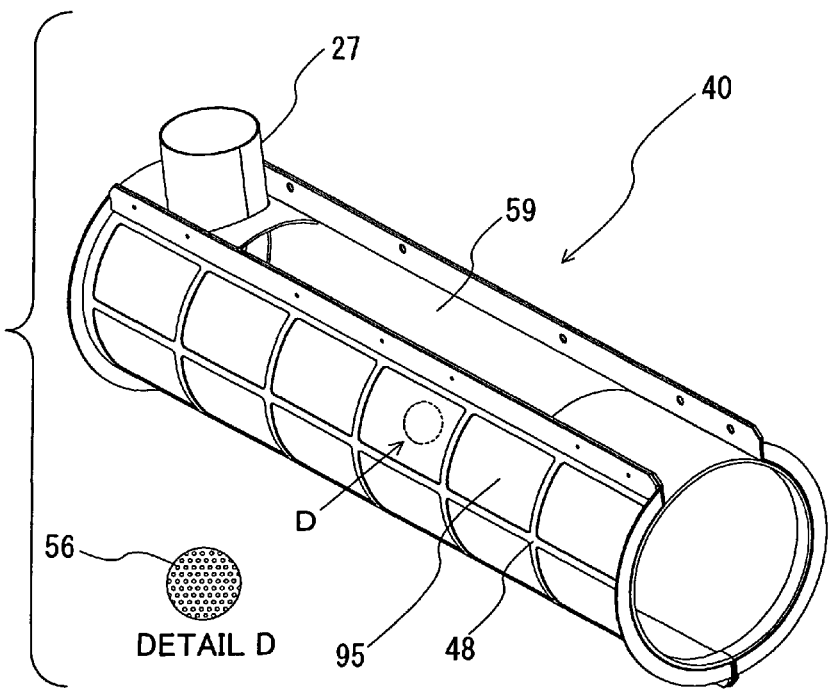
FIG. 12 is a perspective view of the drying chamber 40.

As shown in FIG. 12, the drying chamber 40 is comprised of a cylindrical screen 95 secured to a frame 48. FIG. 12 also shows in detail a portion D of the screen as indicated by a dotted circular line on the screen. As can be seen from the detailed view of the screen, it has innumerable apertures 56 formed therein. Size of each perforation should be smaller than that of each grain. The screen 95 has an opening 59 at the upper portion of the drying chamber 40 within the shell 31, the opening being connected to the blow duct 34. A source of hot air generation such as a heat exchanger is in communication with the blow duct 34 through the inlet opening 49 to blow hot air through the opening 59 into the drying chamber 40 so that it can be supplied onto the grains which are conveyed and stirred by the conveyor and stirring plates within the drying chamber 40.

The exhaust pipe 35 is provided on the underside of the drying unit C and has an outlet opening 50 which is connected to a suction fun (not shown). The hot air from the inlet opening 49 is drawn through the opening 59 into the drying chamber 40 under the action of the suction fan to pass through a layer of deposition of the grains which are stirred and conveyed within the drying chamber 40. The hot air then passes through the apertures 56 in the screen 95 so that it is exhausted through the exhaust pipe 35 and the outlet opening 50.

There is provided an outlet opening 47 for discharge of the grains within the drying chamber 40. Reference numeral 52 indicates a lid provided at lower end of the exhaust pipe 35. A lever 53 is arranged to rotationally move along a guide plate 54, thereby opening or closing the lid 52. When the coating apparatus 1 is to be cleaned, any rubbish in the apparatus can be discharged through the opened exhaust pipe.

Operation of the coating apparatus will now be described. Grains are supplied through the opening 2 into the hopper 3 in the binder coating unit A. The rotary valve 4 continuously feeds the metered grains from the hopper 3 through a feed pipe 7 toward the single thread screw conveyor 60 in the shell 8. The grains are conveyed through the shell toward the outlet opening 29 by the single thread screw conveyor 60. Binder is sprayed through the nozzle opening 20 in the nozzle 17 in the atomized form onto the grains in the shell to coat the grain surfaces with the binder.

The binder is for adhering to the grains powdered coating material itself having no adhesion, to the surfaces of the grains during the coating step following the binder coating step. Any materials having adhesion, which can be sprayed by the nozzle 17 may be used as binder. Coating material (coating liquid) which is used in a conventional method for production of coated rice may be employed.

Edible binder includes starch base solution or decomposition liquid, water soluble vegetable fibers (indigestible dextrin and the like), and polysaccharides (guar gum, gum Arabic and the like).

The amount of binder to be added to the grains is 0.5 to 10 parts by weight per 100 parts by weight of the grains. In the case where the grains of 100 kg/h is fed to the binder coating unit A and the amount of binder is 6 parts by weight, the binder of 6 kg/h is sprayed by the nozzle 17. The amount of the binder depends on types of grains, types of binder, concentration of the binder or purpose of use of products and may be adjusted at an appropriate value which is determined by a test or the like.

Rotation of the shaft 10 causes the stirring vanes 16 to be rotated, thereby stirring the grains to coat uniformly the surfaces of the grains with binder. The grains having the uniformly coated binder thereon are then discharged through the outlet opening 29.

The discharged grains move downwardly through the transferring passage 27 to the region 61 therein. At the region 61, a predetermined amount of the powdered material is fed by screw conveyer 63 of the metering feeder 62 to the grains which are then supplied through the inlet opening 68 into the shell 66.

The amount of the powdered coating material is possible up to 12 parts by weight per 100 parts by weight of the grains. For example, the powdered material of 12 kg can be deposited onto the grains of 100 kg. In other words, in the case where the amount of the grains to be supplied into the coating unit B is 100 kg/h and the amount of the powdered material is 12 parts by weight per 100 parts by weight of the grains, the metering feeder 62 feeds the powdered coating material of 12 kg/h to the region 61. The amount of the powdered material may vary, depending on types of grains, types of binder, particle size of the grains or purpose of use of products and may be adjusted at an appropriate value which is determined by a test or the like.

The powdered material comprises powder consisting of slightly soluble or insoluble effective component, such as rice bran, wheat bran or the like. In the case of the rice bran, raw rice bran or degreased rice bran or their parched rice or wheat bran may be used.

In the case of powder consisting of effective component as described above, the powder having smaller particle size can easily be deposited or adhered onto the surfaces of the grains. Therefore, the powder is preferably processed to have particle size of less than 150 μm. In the case of being intentionally representative of the effective component by visibility or eating feeling, the grains may be processed to have particle size larger than 150 μm. In the embodiment of the invention, raw rice bran having the particle size of 100 μm was used.

The stirring action of the stirring vanes 80 due to the rotation of the shaft 79, and the action of vibration transmitted to the shell 66 by the vibrating motors 87, 88 cause the grains to be conveyed through the shell 66 toward the outlet openings 69, 70.

At this point, the discharge pipe 73 is partially closed at its outlet opening by the closure plate 72 to retain in the shell 66 the grains up to about 70 percents of a volume of the shell 66 and the remaining grains overflow the upper outlet opening 70 into the discharge pipe 71. Thus, the surfaces of the discharged grains have the powdered material deposited or adhered uniformly thereto.

As described above, upon completion of the adhering process, the grains are discharged through the discharge pipe 71, 73 into the discharge duct 75 and then exposed to hot air flowing downwardly through inlet opening 97 into the discharge duct 75 to dry the surfaces of the grains and to disperse the grains in the discharge duct 75. The dispersed grains pass through the inlet opening 98 to reach the triple thread conveyor 30. The hot air acts to dry quickly the binder on the grain surfaces and to disperse uniformly the grains across the discharge duct 75. Temperature and amount of hot air may be suitably varied, depending on types of grains and binder or types of powdered material. In the embodiment of the invention, in order to produce coated rice of 250 kg/h using milled rice as grains, the hot air had temperature of about 50° C. and amount of about 10 m$^3$/min.

At the time when the grains reach the triple thread conveyor 30, the binder on the grain surface inside the layer of powdered material, has not been enough dried yet. In the drying unit C, it is required to fully dry the binder before approaching the outlet opening 47.

Figure 13:
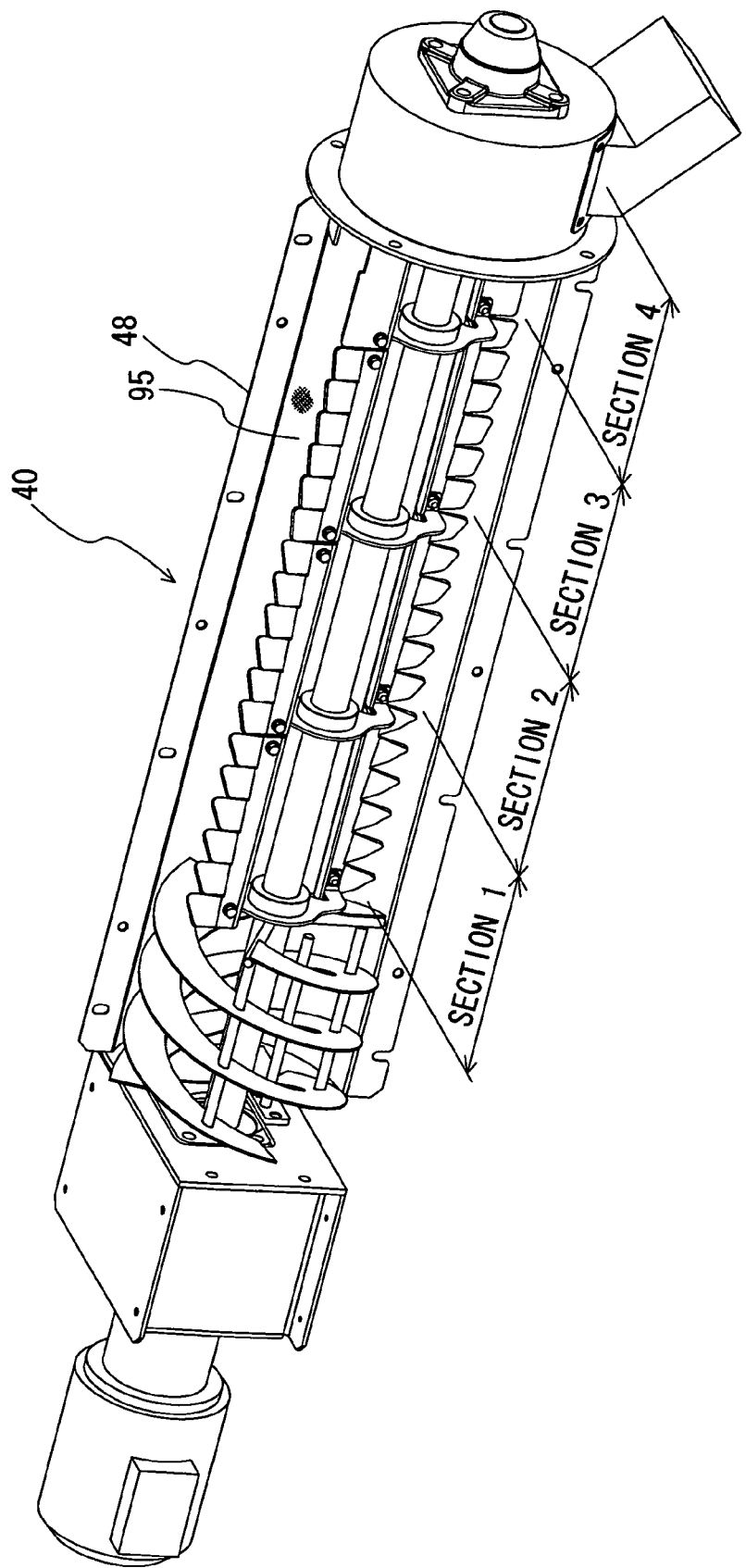
FIG. 13 is a perspective view of the drying unit C to show sections in which the grains are conveyed.

The triple thread conveyor 30 intensively stirs the grains bonded to one another for complete separation of the bonded grains from one another. Rotation of the triple thread conveyor 30 also causes the grains to be conveyed through the shell toward the outlet opening 47. As shown in FIG. 13, stirring means consist of stirring plates 41 (*a*), (*b*), (*c*) and 46 located at corresponding sections 1, 2, 3, and 4. The stirring plates except for the stirring plates 46 contribute to conveyance of the grains through the drying chamber.

As the grains are conveyed to section 1 by the triple thread conveyor 30, they are dried by the hot air in the section 1 while being stirred by the rotating stirring plate 41 (*a*). Since each of the paddles 55 of the stirring plates 41(*a*) has angle of 45 degree relative to the longitudinal axis of the shaft 37 in this embodiment, the paddles 55 convey the grains to section 2 while stirring the grains. It will be appreciated that since at the initial drying stage, the un-dried grains are continuously conveyed to section 1 by the triple thread conveyor 30, smooth conveyance of them to section 2 is required to avoid clogging which could occur due to deposition of the grains in section 1. Therefore, the angle of 45 degree of each of the paddles 55 of the stirring plates 41(*a*) makes the fastest speed of conveyance of the grains possible.

In section 2, the grains are also dried by hot air while being stirred by the rotating stirring plates 41(*b*). Since each of the paddles 55 of the stirring plates 41(*b*) has angle of 30 degree relative to the longitudinal axis of the shaft 37, the grains are conveyed to section 3 while being stirred by the paddles. The speed of conveyance of the grains by the paddles 55 in the section 2 is lower than by the paddles 55 in section 1. The drying of the binder on the grain surfaces is progressive in section 2 so that any clogging of the grains is more unlikely to occur as compared with section 1. Therefore, the angle of each of the paddles 55 in the section 2 permits slower speed of conveyance of the grains than in section 1, thereby making longer drying time for the grains in section 2 possible.

In section 3, the grains are dried by hot air while being stirred by the rotating stirring plates 41(*c*). Since each of the paddles 55 of the stirring plates 41(*c*) has angle of 15 degree relative to the longitudinal axis of the shaft 37, the paddles convey the grains to section 4 while stirring the grains. The action of conveyance of the grains by the paddles 55 in the section 3 is not stronger than by the paddles 55 in section 1. In other words, the speed of conveyance of the grains in section 3 is lower than in section 2. Since drying of the binder on the grain surfaces is further progressive in section 3 so that any clogging of the grains is unlikely to occur. Therefore, the angle of each of the paddles 55 in the section 3 permits slower speed of conveyance of the grains than in section 1, thereby making longer drying time for the grains in section 3 possible.

In section 4, the grains are dried by hot air while being stirred by the rotating stirring plates 46. Since each of the stirring plates 46 has no paddles and is secured to the holders parallel to the longitudinal axis of the shaft 37, it has no action of conveyance of the grains toward the outlet opening 47. As a result, the grains in section 4 are more slowly moved than in section 3. When the grains are conveyed to section 4 by the paddles, the binder on the grains has nearly completely been dried so that any clogging does not occur in section 4. Due to the fact that the grains are moved more slowly than in section 3, longer drying time for the grains in section 3 can be achieved.

As described above, the stirring plates 46 in section 4 has no action of conveyance of the grains toward the outlet opening 47. Since the grains are continuously conveyed from section 3, however, they can be continuously discharged through the outlet opening 47 without retention of the grains in section 4.

The grains which have been supplied into drying unit C, are stirred by the rotating stirring plates 41 and 46 in the drying chamber 40 during conveyance of grains through section 1 to section 4 and furthermore, after the binder on the grain surfaces has been completely dried by hot air which is always supplied through the inlet opening 59 into the drying chamber 40, the dried grains are discharged through the outlet opening 47 to provide products.

The temperature and amount of hot air may suitably vary, depending on types of grains and binder or types of coating material. For example, in order to produce coated rice of 250 kg/h using milled rice as grains, the hot air had temperature of about 50° C. and amount of about 10 m$^3$/min.

Since during the conveyance of the grains from section 1 to section 4, the grains are stirred by the rotating stirring plates 41 and 46 in the drying chamber 40, the grain surfaces are smoothly formed by rubbing the grains against one another and by contacting the perforated screen 95 of the drying chamber 40.

As described above, there is made a difference in actions of conveyance of the grains between the two adjacent sections. The degree of action of conveyance of the grains stepwise decreases from section 1 toward section 4, the action of conveyance of the grains is most intense in section 1, and become weaker toward the outlet opening of the drying unit.

The stirring plates 41(*a*) with the paddles 55 having angle of 45 degree is located in section 1 so that the stirring plates can convey grains to section 2 while stirring the grains without any clogging of the grains conveyed by the triple thread conveyor 30. If the stirring plates 46 were located in section 1 and a large quantity of grains were conveyed by the triple thread conveyor 30 to section 1, the grains would be deposited in section 1 so that clogging of the grains would occur at a position of deposition without any stream of the grains.

The action of conveyance of the grains stepwise becomes weaker in sections 2 and 3 so that the grains can be smoothly conveyed to section 4. In the invention, there are provided four different actions of conveyance from section 1 to section 4 but not limited. For example, in the case where a small amount of grains is coated with binder and powdered material is adhered to the grains under the condition in which any clogging of the grains is unlikely to occur in the drying unit C, there may be provided two sections having different actions of conveyance. Inversely, in the case where binder is difficult to be dried and powdered material is adhered to the grains under the condition in which clogging of the grains is likely to occur in the drying unit C, the number of sections having different actions of conveyance may be increased.

Since the actions of conveyance stepwise become weaker from section 1 toward section 4, the speed of conveyance of grains is slower in section having the weaker action of conveyance to result in increase in amount of the grains in that section. If stirring plates 41(*a*) were employed for all the stirring plates 41 in sections 1-4, longer distance of conveyance would be provided to obtain sufficient drying time. According to the invention, longer drying time can be obtained without making the distance of conveyance longer and this makes compactness of the coating apparatus possible.

The invention claimed is:

1. A coating apparatus, comprising:
a binder coating unit comprising a coating chamber defined by a cylindrical shell, coating chamber stirring and conveying means mounted in the coating chamber along a longitudinal direction of the coating chamber for rotation and adapted to be rotationally driven for conveyance of grains in the coating chamber in its longitudinal direction while stirring the grains, and a nozzle for spraying liquid binder onto the grains transferred to the coating chamber to coat surfaces of the grains with binder;
a powdered material adhering unit comprising an adhering chamber defined by a cylindrical shell, adhering chamber stirring and conveying means mounted in the adhering chamber along a longitudinal direction of the adhering chamber for rotation and adapted to be rotationally driven for conveyance of grains having the binder thereon through the adhering chamber in its longitudinal direction while stirring the grains having the binder thereon, and a metering feeder for adding powdered material to the grains having the binder thereon; and
a drying unit comprising a drying chamber comprised of a permeable cylindrical screen, drying unit stirring means mounted in the drying chamber along a longitudinal direction of the drying chamber for rotation and adapted to be rotationally driven to convey the grains through the drying chamber in its longitudinal direction while stirring the grains after the grains have been transferred from said adhering unit to the drying chamber, a blow passage for blowing hot air into the drying chamber to dry the grains, and an exhaust passage for exhausting the hot air from the drying chamber.

2. A coating apparatus according to claim 1, wherein said drying unit stirring means comprises a shaft mounted in the drying chamber along its longitudinal direction for rotation, and comprises a plurality of stirring plates mounted on the shaft along its longitudinal axis and arranged to convey the grains at stepwise decreased speeds of conveyance in a downstream direction of conveyance.

3. A coating apparatus according to claim 1, wherein said drying unit stirring means comprises stirring plates mounted on said shaft along a longitudinal axis of the shaft and parallel to the longitudinal axis of the shaft, each of the stirring plates comprising a plurality of paddles, with tips of said paddles having an angle relative to the direction of conveyance of the grains.

4. A coating apparatus according to claim 1, wherein said powdered material adhering unit further comprises means for applying vibration to the cylindrical shell defining the adhering chamber.

5. A coating apparatus according to claim 2, wherein said powdered material adhering unit further comprises means for applying vibration to the cylindrical shell defining the adhering chamber.

6. A coating apparatus according to claim 3, wherein said powdered material adhering unit further comprises means for applying vibration to the cylindrical shell defining the adhering chamber.

* * * * *